Nov. 14, 1967     S. S. SHIELDS     3,352,763

DRY CLEANING SOLVENT PURIFYING APPARATUS

Original Filed Dec. 5, 1960     2 Sheets-Sheet 1

INVENTOR.
SEBOUGH S. SHIELDS
BY
ATTORNEYS

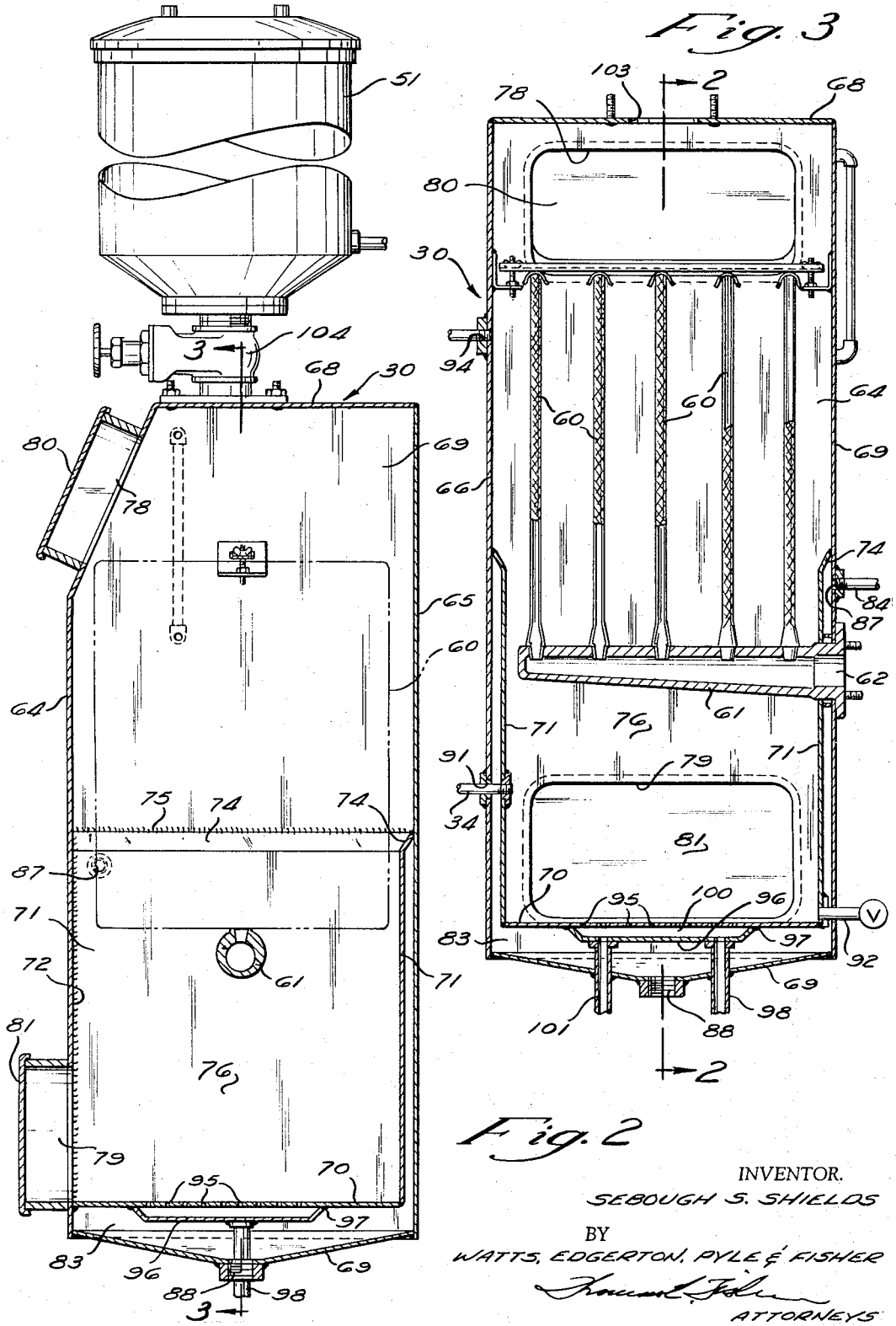

United States Patent Office 3,352,763
Patented Nov. 14, 1967

3,352,763
DRY CLEANING SOLVENT PURIFYING
APPARATUS
Sebough S. Shields, Cleveland Heights, Ohio, assignor to
Noubar S. Abdalian, Euclid, and Robert V. Abdalian,
Cleveland Heights, Ohio
Continuation of application Ser. No. 73,608, Dec. 5, 1960.
This application Dec. 17, 1964, Ser. No. 421,150
5 Claims. (Cl. 202—200)

ABSTRACT OF THE DISCLOSURE

Dry cleaning solvent is vaporized in the presence of steam, the vapors of which permeate vertically disposed filters overlying the solvent. A steam jacket surrounds the solvent and terminates below the major portions of the filters.

---

This application is a continuation-in-part of the copending application Ser. No. 5,426, filed Jan. 29, 1960, under the title "Dry Cleaning Apparatus," now Patent No. 3,097,164, issued July 9, 1963, and a continuation of application Ser. No. 73,608, filed Dec. 5, 1960, now abandoned.

This invention relates to dry cleaning systems and more particularly to a solvent purifying device in such a system.

The elements of the usual dry cleaning system includes a cleaning chamber, a pump, a supply tank, and a main filter for removing impurities from a circulated solvent. In addition to the usual connections between these listed elements, the elements are normally connected to a device which is a solvent purifying or reclaiming still and is known as a "muck cooker." This invention is directed to a muck cooker which is a multi-purpose device. The purposes include filtering the solvent to remove dissolved or suspended solid impurities including filter powder and liquid impurities from dry cleaning solvents delivered from the filter tank to the cooker. A second purpose is to reclaim solvent from the filter powder and other impurities. Another purpose is accomplished by occasionally pumping the solvent into the muck cooker for distillation.

In the operation of a dry cleaning system the flow of fluid through the main solvent filter is reversed periodically to reverse flush the main filter. During reverse flushing solvents are conducted in through a main filter tank opening which is usually the outlet, through the elements of the main filter in a direction reverse to normal flow, and out an outlet passageway provided for the purpose near the bottom of the main filter tank. The reverse flush solvent and impurities including used filter powder are flushed into the muck cooker.

With the muck cooker of this application, a plurality of filters are mounted in the muck cooker chamber, solvents reverse flushed into the cooker pass through the cooker filters into a manifold and then through an outlet which is connected to the supply tank. Thus, another feature of this invention is that the muck cooker serves as a supplemental or sub-filter as one of its purposes.

Filter powder and other impurities collect in the bottom of the muck cooker during each reverse flushing operation. With the structure taught in this case, it is possible to reverse flush the main filter repeatedly but only occasionally "cook" the filter powder to purify it. With other solvent purifying apparatus, daily reclaiming or "cooking" of solvents from the filter powder is a requisite.

With this device filter powder is collected in the bottom of the muck cooker. When collected in the cooker the powder can still be used to purify solvents even though it is partially contaminated and has, for that reason, been removed from the main filter by one of the periodic flushings.

After the desired quantity of used filter powder has been collected in the muck cooker, it is heated or cooked to drive off, and thereby reclaim, the solvent.

Another of the advantages of this device is that during the cooking operation live steam is actually passed directly up through the filter powder to provide an efficient reclamation process. In addition to the live steam being passed up through the filter powder, the lower portion of the muck cooker which carries the filter powder is heated by a steam jacket which assists to the cooking. The steam and vaporized solvents rise together through the muck cooker and out a top outlet opening into a condenser. In the condenser the vapors are cooled to liquify them and the liquids are then transported to a water separator. In the water separator water is, as the name implies, taken off. The remaining solvent is then conducted to a reverse tank and returned to the supply tank as needed.

Another feature of this invention will be readily apparent from the foregoing discussion. This feature is that the muck cooker may also be used as a still. Solvent may be conducted directly from the supply tank or from the primary filter into the muck cooker to distill the solvent and separate it from impurities which are suspended or dissolved in it and which are not removable by the filters or filter powder.

Other features and a fuller understanding of the invention may be had by referring to the following description and claims, taken in conjunction with the accompanying drawings, in which:

FIGURE 2 is a sectional view of the novel and improved muck cooker as seen from the plane indicated by the line 2—2 of FIGURE 3; and, FIGURE 3 is a sectional view of the device as seen from the plane indicated by the line 3—3 of FIGURE 2 with the condenser not shown for clarity of illustration.

Figure 1:
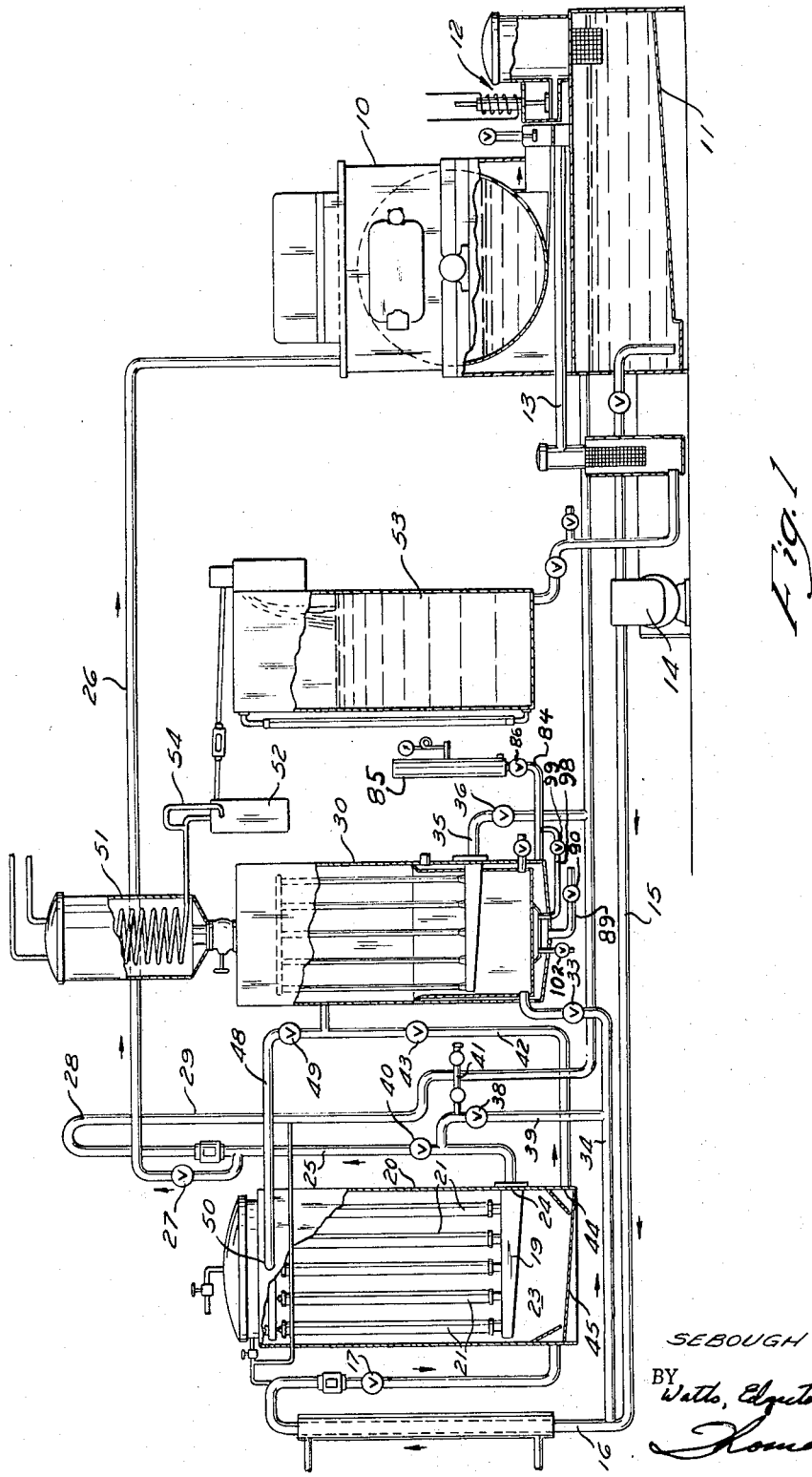
FIGURE 1 is a schematic plan view with parts broken away and removed of a dry cleaning system incorporating the novel and improved muck cooker.

The detailed operation of a dry cleaning system is explained in United States Patent No. 2,729,861 issued Jan. 10, 1956 and entitled "Dry Cleaning Apparatus." The present invention utilizes elements and methods of operation quite similar to the structure disclosed and taught in that patent. The features which are environmental to the present invention and shown in detail in that patent will only be described briefly here.

In the drawing, a dry cleaning compartment 10 is shown. The compartment 10 is connected to a solvent storage tank 11 by a valve and pipe system designated generally at 12. This valve and pipe system 12 selectively directs solvent discharged from the compartment 10 either into the storage tank 11 or into a bypass pipe 13. A circulating pump 14 is provided which can pump a solvent either from the storage tank 11, or from the bypass pipe 13, or both, through the system.

During normal operation, the circulating pump 14 constantly pumps solvent into a delivery pipe 15. The solvent passes from the delivery pipe 15 through a main filter supply pipe 16 when a control valve 17 connected to the main filter supply pipe 16 is open. The main filter supply pipe 16 is connected to a main filter tank 20 through an inlet opening 22. The inlet opening 22 is near the bottom of the main filter tank 20.

The main filter tank defines a solvent chamber 23. A plurality of lint filters 21 are carried by a manifold 19. The manifold 19 and filters 21 are disposed within the solvent chamber 23.

The manifold 19 connects the lint filters to a main filter outlet opening 24. The details of the lint filters and manifold are more completely disclosed in copending application for patent Ser. No. 83,200, filed Jan. 17, 1961, by Noubar S. and Robert V. Abdalian under the title, "Filtering Apparatus for Dry Cleaning Solvents."

A main filter outlet conduit 25 delivers filtered solvent from the tank 20. The filtered solvent may pass through a cleaning compartment delivery conduit 26 into the cleaning compartment 10. A valve 27 controls the flow of filtered solvent through the delivery conduit 26. When the valve 27 is closed the filtered solvent passes through a gravitational valve 28 and thence through a return conduit 29 back to the storage tank 11.

A solvent purifier in the form of a specialized filtering still 30 is provided. This specialized still or reclaimer is the device known in the dry cleaning industry as a "muck cooker." The structure and operation of the preferred muck cooker will be described in detail below.

Periodically, all the solvent in the system may be pumped through the muck cooker for a purifying process. To accomplish this a muck cooker supply valve 33 is opened and solvent is then pumped from the storage tank 11 through the supply conduit 15 and a muck cooker supply conduit 34 into the muck cooker. The purified solvent is returned to the storage tank 11 by a muck cooker return conduit 35 which is controlled by a muck cooker return conduit valve 36. The muck cooker return conduit 35 is connected to the return conduit 29.

The muck cooker usually contains a supply of solvent filtering powder which has been used in the main filter to purify the solvent. The filtering powder is used in the filter tank to remove dissolved and suspended impurities from the solvent. The powder is delivered to the muck cooker by a process known as "reverse flushing."

Periodically it is desirable to clean the lint filters 21 and the main filter tank by this reverse flushing process. This is accomplished by closing the main filter inlet control valve 17 and opening a reverse flushing inlet control valve 38. Solvent is then conducted from a pump outlet through the muck cooker supply conduit 34 and thence through a reverse flushing conduit 39 into the manifold 19 through what is normally the outlet of the tank 20. A filtered solvent outlet control valve 40 is also closed to close the main filter outlet conduit 25 and cause the reversely directed solvent to flow into the manifold 19 rather than the conduit 25.

When the solvent is pumped through the reverse flushing conduit 39 into the manifold 19, it passes in a reverse direction through the filters 21, flushing lint particles, filter powder encrusted on the filters and other filtered out objects off the lint filters 21. Air may be introduced through an air conduit 41 when valve 56 is open to assist in loosening this encrusted powder and other filtered out objects from the filters 21. A reverse flushing outlet conduit 42 is opened by opening the reverse flushing conduit control valve 43. The reverse flushing conduit 42 conducts solvent and suspended powder from a main filter flushing outlet passage at 44 into the muck cooker 30. A slanted baffle 45 helps the flowing solvent carry the filter powder, filtered lint sediment, and the like, out through the reverse flushing outlet opening 44 which, as will be seen by examining the drawing, is at the bottom of the main filter tank 20.

The solvent passes through sub-filters 60 in the muck cooker and then into a sub-filter manifold 61. The solvent flows through the manifold 61 thence through an outlet 62 and then through the cooker return conduit 35 back to the supply tank. As the reverse flushing proceeds the powder separated by the sub-filters settles to the bottom of the muck cooker. This settled powder is, after the reverse flushing is completed, a slurry of used filter powder and solvent. After the reverse flushing is completed a fresh supply of filter powder is inserted in the filter tank 20.

Normally this reverse flushing will be accomplished about once a day. One of the outstanding advantages of this device is that only periodically, perhaps once a week and in a manner which will be described, the slurry or "muck" is cooked. This cooking is accomplished by passing steam up through the sediment, or muck, in the cooker to carry solvents into a condenser chamber 51. The condenser vapors are conducted to a water separator 52. Solvent then passes from the water separator 52 to reserve tank 53 while water is discharged from tube 54.

The disclosed system also has a light contaminant outlet conduit 48 which connects the top of the chamber 23 with the muck cooker 30. The connection of the light contaminant outlet to the tank 20 is identified by the numeral 50. This connection is near the top of the tank and slightly below the normal fluid level of the tank to permit water and other light-weight contaminants to be tapped off.

The outlet contaminant conduit 48 is controlled by a valve 49. Impurities may be directed from the top of the chamber 23 to the muck cooker 30, at any time when the pump 14 is operating by opening the valve 49. The features and advantages of the contaminant conduit 48 are disclosed in greater detail in copending application Ser. No. 5,426, of which this case is a continuation-in-part.

The muck cooker 30 has front and back side walls 64, 65 respectively. The cooker also has side walls 66, 67 which connect the front and back walls and top and bottom walls 68, 69 respectively. An inner liner comprised of a bottom 70 and in the preferred and disclosed embodiment three sides 71, is disposed within the walls 64–69 of the cooker 30. Two of the sides 71 and the bottom 70 are endlessly connected along their face at 72 to the front wall 64. An outwardly directed flange 74 is provided at the top of each of the liner sides 71. The rim of the flanges 74 are endlessly secured at 75 to the side wall 66 and the back wall 65.

The wall 64, 65, 66 above the connection 75, the front wall 64, the top wall 68, and the liner together define a solvent chamber 76. The sub-filters 60 are, as will be apparent, disposed within this chamber 76 and filter powder removed from flowing solvent by the sub-filters 60 will collect in the lower portion of the chamber resting on the bottom 70 of the liner.

A filter access aperture 78 is provided in a slanted upper portion of the front wall 64. The sub-filters may be inserted and removed through this aperture for repair, cleaning, or replacement. A chamber cleanout aperture 79 is provided in line with the liner bottom 70. Periodically after solvent has been removed and reclaimed from used filter powder, the cleansed or purified powder may be shoveled out through the cleanout aperture 79. Doors 80, 81 are suitably fixed, through means not shown, across the apertures 78, 79 to seal them when the device is in use.

The liner is spaced inwardly from the side and back walls 66, 67 65 and upwardly from the bottom wall 69 to define a steam chamber 83 therebetween. The steam chamber or jacket 83 has a steam supply conduit 84 connected to a source of steam 85, FIGURE 1. A valve 86 is provided to control the flow of steam through the line 84. When the valve 86 is open steam is conducted by the conduit 84 through a steam inlet aperture 87 and into the steam jacket 83. The bottom wall 69 is slanted to a water and steam outlet 88 which has a conduit 89 connected to it. A valve 90 controls the flow of waste steam and water through the outlet conduit 89. The conduit 89 may be, as indicated schematically, vented to the atmosphere but preferably it is connected to a sewer or a condensing tank when the device is installed.

The supply conduit 34 which connects the pump 14 to the cooker passes through the steam chamber 83 at 91 and is peripherally sealed to the side wall 66 and the liner side 71. Similarly a drain conduit 92 passes through the steam chamber 83 and is peripherally sealed to the liner side 71 and the back side wall 69. These conduits 34, 92 are both in communication with the lower portion of the solvent chamber 76 to provide efficient operation. The drain conduit 92 is provided to drain any fluids out of the muck cooker if that is desired. A valve 93 is provided in the conduit 92 to accomplish this purpose. Since it is a conduit for draining the chamber 76, it must be adjacent the liner bottom 70. The solvent inlet at 91 is in the lower portion of the chamber so that solvent brought directly from the tank for supplemental filtering or distilling will pass through any solvent powder which may be in the lower portion of the tank and obtain advantages of filtration through this powder.

Another inlet to the chamber 76 is provided at 94. This inlet is connected to the heavy and light contaminant conduits 42, 48. This inlet 94 is above the connection 75 and therefore above the liner.

One of the outstanding advantages of this invention resides in the fact that live steam may be brought directly through the filter powder being purified. This is accomplished by providing a series of apertures 95 in the liner bottom 70. A dish-shaped supplemental liner 96 has its upper rim welded or otherwise secured to the liner bottom 70 at 97. A steam conduit 98 with a control valve 99, FIGURE 1, connects the steam source 85 to a cavity 100 defined between the liner bottom 70 and the sub-liner 96. An outlet tap 101 with a suitable valve 102, FIGURE 1, is also connected to the sub-liner 96 to permit any condensed steam to be drained off periodically.

With this arrangement one may distill the solvent by using only the steam jacket 83. Alternately, steam may be passed through the inner jacket or cavity 100 and up through the chamber 76 for either purifying powder or distilling solvent. When either a powder purifying or distilling operation is going on, vapors pass upwardly through an outlet 103 in the top wall 78, assuming control valve 104 is open, and into the condenser 51.

While the invention has been described with a great deal of detail, it is believed that it essentially comprises a novel and improved solvent purifier which is a solvent reclaimer, a still, and a sub-filter, which apparatus performs each of these functions in an improved manner.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. In combination with a dry-cleaning apparatus, a solvent purifier comprising:
   (a) sides and a base defining a solvent purifying chamber having a top vapor outlet;
   (b) a filter outlet manifold extending horizontally in the chamber and providing a solvent outlet;
   (c) filters in said chamber and communicating with said outlet manifold;
   (d) members secured to the sides and defining a steam jacket spaced external of lower portions of the chamber and below and contacting the base, said jacket extending above said manifold and terminating below the major portions of the filters;
   (e) a dish-like supplemental liner connected to the base to define a steam and trap cavity therebetween;
   (f) said base having openings therethrough providing communication between said cavity and said chamber;
   (g) a first steam conduit connected to said jacket space and a second steam supply conduit connected to said cavity;
   (h) drain conduits connected to the jacket and said cavity;
   (i) a plurality of valves with one of said valves connected to each of the conduits;
   (j) steam supply means connected to the first and second steam conduits; and,
   (k) said steam jacket space being defined in part by said base around said supplemental liner.

2. A dry cleaning solvent purifying device comprising:
   (a) a top, a base, and sides extending between said top and base to define a solvent purifying chamber having a solvent inlet and a solvent outlet;
   (b) said top having a vapor outlet port;
   (c) a condenser connected to said vapor outlet port;
   (d) a filter outlet manifold extending horizontally in the chamber and connected to the outlet;
   (e) filters in said chamber and communicating with said outlet manifold;
   (f) a steam jacket connected in spaced adjacent relation to said base and a lower exterior of at least one of said sides, and defining a heating cavity therewith;
   (g) said jacket having an upper end spaced substantially from said top above said manifold and below the major portion of the filters so that said heating cavity heats a lower residue collecting portion of the chamber only, and an upper portion of the chamber between the vapor outlet and residue collecting portion of the chamber is unheated;
   (h) said base including a double-walled portion defining a steam cavity;
   (i) the interior surfaces of the base including an innermost wall of said double-walled portion providing a residue collecting and supporting surface;
   (j) steam and drain conduits connected to the outermost of said double wall portion and communicating with said steam cavity through said outermost wall portion;
   (k) said outermost wall portion being imperforate other than said communication and said innermost wall portion having a plurality of steam conducting ports connecting the steam cavity to the solvent chamber;
   (l) steam supply means connected to said steam conduit for the introduction of steam into said cavity thence through said ports and up through the residue in the lower portions of said chamber;
   (m) said steam jacket having a stream inlet communicating with said heating cavity; and,
   (n) second steam supply means connected to said steam jacket inlet for introducing into said heating cavity and thereby heating the lower portions of said chamber.

3. A dry cleaning solvent purifying device comprising:
   (a) a top, a base, and sides extending between said top and base to define a solvent purifying chamber having a solvent inlet and a solvent outlet;
   (b) said top having a vapor outlet port;
   (c) a condenser connected to said vapor outlet port;
   (d) a filter outlet manifold extending horizontally in the chamber and connected to the outlet;
   (e) filters in said chamber and communicating with said outlet manifold;
   (f) a steam jacket connected in spaced adjacent relation to said base and a lower exterior of at least one of said sides and defining a heating cavity therewith, said jacket extending above said manifold and terminating below the major portion of the filters;
   (g) said base including double-wall and single-wall portions, one wall portion being peripherally arranged around the other wall portion, said double-wall portion defining a steam cavity;
   (h) the interior surfaces of the single wall portion and of the innermost of said double-wall portion providing a residue collecting and supporting surface;
   (i) steam and drain conduits connected to the outermost of said double wall portion and communicating with said steam cavity through said outermost wall portion;

(j) said outermost wall portion being imperforate other than said communication and said innermost wall portion having a plurality of steam conducting ports connecting the steam cavity to the solvent chamber;

(k) steam supply means connected to said steam conduit for the introduction of steam into said cavity thence through said ports and up through said chamber;

(l) said steam jacket having a stream inlet communicating with said heating cavity; and, (m) said steam supply means also being connected to said steam jacket inlet for introducing steam into said heating cavity.

4. An apparatus useable in combination with dry cleaning equipment for filtering solvent from a slurry of solvent and filter powder cleaned from a main filter, for reclaiming the solvent from the filter powder, and for periodically purifying the solvent by distillation, said apparatus comprising:

(a) top, bottom, and side chamber walls defining a solvent chamber;

(b) at least one of said walls having a solvent inlet and a filtered solvent outlet;

(c) a filter outlet manifold extending horizontally in the chamber and communicating with said outlet;

(d) filters in said chamber and communicating with the manifold;

(e) side and bottom jacket walls secured to the chamber walls in spaced relation to the chamber walls so as to define a heating cavity between them;

(f) one of said bottom walls forming a base for receiving the residue filtered from the slurry of solvent and filter powder;

(g) said manifold and filters being spaced from the base sufficiently to accommodate the residue from several cleanings of the main filter;

(h) the heating cavity defined by the spaced chamber and jacket walls extending from the base to adjacent the manifold and filters with the top of said heating cavity above said manifold and terminating below the major portion of the filters so that the entire accumulation of residue is heated from its side as well as its bottom and only the residue collecting portion of the chamber is heated;

(i) a supplemental liner positioned in closely spaced relation to the central portion of the base and having its periphery secured to the base, the periphery of the liner being substantially inwardly of the periphery of the base, the space between the liner and the central portions of the base comprising a steam cavity;

(j) a first steam conduit connected to one of said walls and opening into said heating cavity to supply steam thereto;

(k) a second steam supply conduit connected to said liner and opening into said steam cavity to supply steam thereto;

(l) steam supply means connected to said first and second steam conduits;

(m) a first drain conduit connected to the other of said bottom walls and opening into said heating cavity;

(n) a second drain conduit connected to said liner and opening into said steam cavity;

(o) the central portions of said base within the periphery of the liner having a plurality of port openings providing communication between said steam cavity and said chamber;

(p) solvent supply conduits connected to said solvent inlet and solvent outlet respectively;

(q) a plurality of valves with one of said valves connected to each of said conduits;

(r) a solvent vapor outlet in said top wall; and, (s) a condenser connected to said vapor outlet whereby when said apparatus is used for reclaiming solvent from the residue, steam is admitted to both cavities and the entire base is heated as well as permeating the residue with steam and when said apparatus is used for distilling steam is admitted to said heating cavity and heats directly the portions of the base around the linear and heats the central portion of the base through the close space between the liner and the base.

5. The device of claim 4 wherein the solvent input is located between the base and the manifold and filters so that the incoming solvent is filtered by the accumulated filter powder collected on the base.

References Cited

UNITED STATES PATENTS

| | | | |
|---|---|---|---|
| 194,256 | 7/1877 | McKeever | 203—49 XR |
| 783,307 | 2/1905 | Pittman | 202—233 XR |
| 1,281,597 | 10/1918 | Lessing | 203—41 XR |
| 1,319,984 | 10/1919 | Wolff | 203—39 XR |
| 1,727,964 | 9/1929 | Coleman | 34—37 XR |
| 2,301,803 | 11/1942 | Davis | 210—167 XR |
| 2,702,433 | 2/1955 | Cohen | 34—37 |
| 2,925,367 | 2/1960 | Soelberg | 202—176 |
| 3,089,250 | 6/1963 | Victor | 203—95 XR |

NORMAN YUDKOFF, *Primary Examiner.*

D. EDWARDS, *Assistant Examiner.*